(12) United States Patent
Fransson

(10) Patent No.: US 6,616,395 B2
(45) Date of Patent: Sep. 9, 2003

(54) PALLET LIFTING FORK TRUCK

(76) Inventor: Anders Fransson, Kaprifolgränd 6, S-595 54 Mjölby (SE)

( * ) Notice: Subject to any disclaimer, the term of this patent is extended or adjusted under 35 U.S.C. 154(b) by 0 days.

(21) Appl. No.: 09/956,613

(22) Filed: Sep. 19, 2001

(65) Prior Publication Data

US 2002/0034431 A1 Mar. 21, 2002

(30) Foreign Application Priority Data

Sep. 21, 2000 (EP) .............................. 00850150

(51) Int. Cl.$^7$ ............................. B66F 9/06; B66F 9/22
(52) U.S. Cl. ...................... 414/495; 414/673; 187/222; 187/234; 280/5.515
(58) Field of Search ................ 414/495, 673; 187/234, 222; 280/5.515

(56) References Cited

U.S. PATENT DOCUMENTS

| | | | | |
|---|---|---|---|---|
| 4,782,925 A | * | 11/1988 | Grundei ............... | 188/322.15 |
| 4,830,152 A | * | 5/1989 | Rauert et al. ......... | 188/322.15 |
| 4,886,284 A | | 12/1989 | Martinez, Jr. ......... | 280/43.12 |

FOREIGN PATENT DOCUMENTS

| | | | | |
|---|---|---|---|---|
| DE | 3606515 | * | 8/1986 | |
| DE | 3614986 | * | 11/1987 | |
| DE | 3710776 A1 | | 10/1988 | ........... B66F/9/075 |
| DE | 3937404 | * | 5/1991 | |
| DE | 4019075 | * | 12/1991 | |
| EP | 0 842 797 | | 5/1998 | ......... B60G/17/027 |
| JP | 3177300 | * | 8/1991 | |

* cited by examiner

Primary Examiner—Steven A. Bratlie
(74) Attorney, Agent, or Firm—Hayes Soloway P.C.

(57) ABSTRACT

Springing for support wheels of low lifting trucks arranged below the forks includes a common spring device arranged in the transfer mechanism of the lifting movement to the support wheels. The spring device includes a cylinder, a piston, a spring package of cup springs and an extending push rod that in the cylinder is connected a ring shaped element located between the spring package and the cylinder end through which the push rod extends. The piston is arranged in the other end of the spring package and the cylinder is via a return valve coupled in parallel with the load lifting hydraulic system of the truck so that the pressure in this pretensions the ring shaped element towards the cylinder end proportionally to the load, so that springing does not take place until the dynamics forces overcome the pretension.

11 Claims, 2 Drawing Sheets

PALLET LIFTING FORK TRUCK

BACKGROUND OF THE INVENTION

This invention is related to the type of low-lifting fork trucks that are used to move loading pallets with load in the floor plane. These types of trucks are for instance used for the transferring of loads from lorries into supermarkets or the like and in particular for reloading of freighted goods to and from or between different long distance lorries. In particular the latter use is increasing since the aim is to store the merchandise for as short a time as possible between the producer and buyer, and instead a swift continuous flow from maker or producer to the final buyer or user is desired. The desired swiftness in the reloading thus not only leads to an increased use of these types of trucks but also to an increased demand on their speed. The speeds are already today such that in some cases safety belts are required for the drivers, this in order to avoid injuries at collisions etcetera, as well as to avoid that the driver falls off. The increased speed further means that damage to the transported goods increases, maintenance costs of the trucks increase and the drivers are subjected to harmful vibrations.

The increased speeds do not only mean increased damage at collisions but also mean that an uneven surface of the floor, that at traditional speed are not noted at all, are transformed into shocks that in the long run may become disturbing and tiresome for the driver. These shocks may also lead to the transported goods "shaking or bouncing" off from the loading pallet. Since the support wheels of the truck bounce on the floor a reduction in traction results that in some instances may make the truck more difficult to steer. Trucks that are used today lack a separate spring system. The only damping component is the coating of the wheels. With the increasing demand on speed one has to reduce the "damping" coating of the wheels since a high damping and a high speed will result in a too high heat generation for the wheels. This means that there is a trend towards a situation where damage of trucks, goods and drivers will increase since the dynamic strains increase with speed, and at the same time future demands of even larger loads can be expected to make the problem even worse.

OBJECT OF THE INVENTION

The object of the invention is to eliminate or at least reduce these problems. In accordance with the invention the above problems are solved by providing the fork truck with a spring system (in addition to that, that may possibly exist in the coating of the wheels).

SUMMARY OF THE INVENTION

In general these types of trucks have small support wheels or rollers arranged in the front ends of the forks, which wheels due to their small diameter are particularly sensitive to un-evenness in the floor. It is therefor particularly desirable to provide these wheels with a spring system and one can therefor possibly be satisfied with providing only these wheels with a spring system.

For one skilled in the art of trucks a spring arrangement for the wheels is not logical since the truck at a possible off centered load preferably is not to become inclined since it then may more easily lose its cargo or become unstable. Since furthermore the load of a truck can vary by several tons the spring movement will as is realized either be too long or the springing too hard, in particular when the truck is to be driven empty or with only a small load. In accordance with a further development of the invention this problem is however solved by making the spring system load dependent, for instance by a pretensioning of the working spring device that is proportional to the weight of the load. When a small rock or other protruding unevenness is hit by a spring suspended truck wheel the pretension is overcome by the temporary dynamic additional load and the wheel springs up and reduces in this way the shock that is a result of the unevenness.

BRIEF DESCRIPTION OF THE DRAWINGS

Additional advantageous characteristics as well as advantages of the invention are apparent from the following description of a preferred embodiment taken in conjunction with the drawings in which.

DETAILED DESCRIPTION OF THE INVENTION

Figure 1:
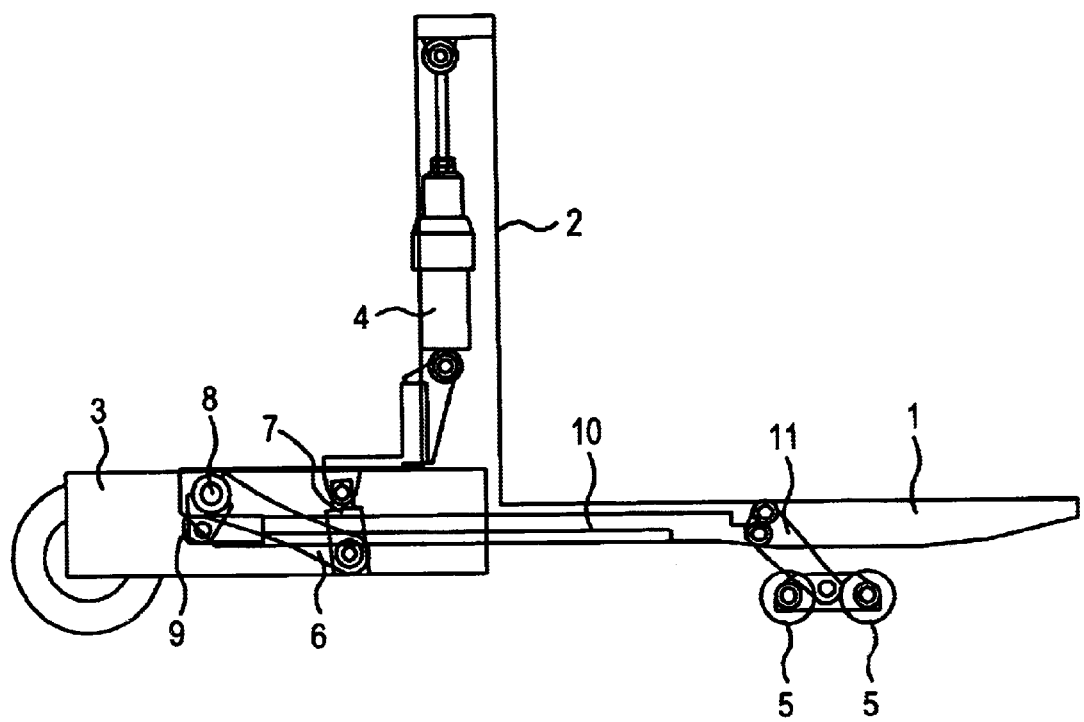
FIG. 1 shows a schematic sketch of an ordinary truck type provided with a device in accordance with the invention and with the forks in elevated position, and FIG. 2 the same truck in a lowered position as to the forks, and FIG. 3 a device in accordance with the invention in more detail including an accompanying hydraulic coupling scheme.
Figure 2:
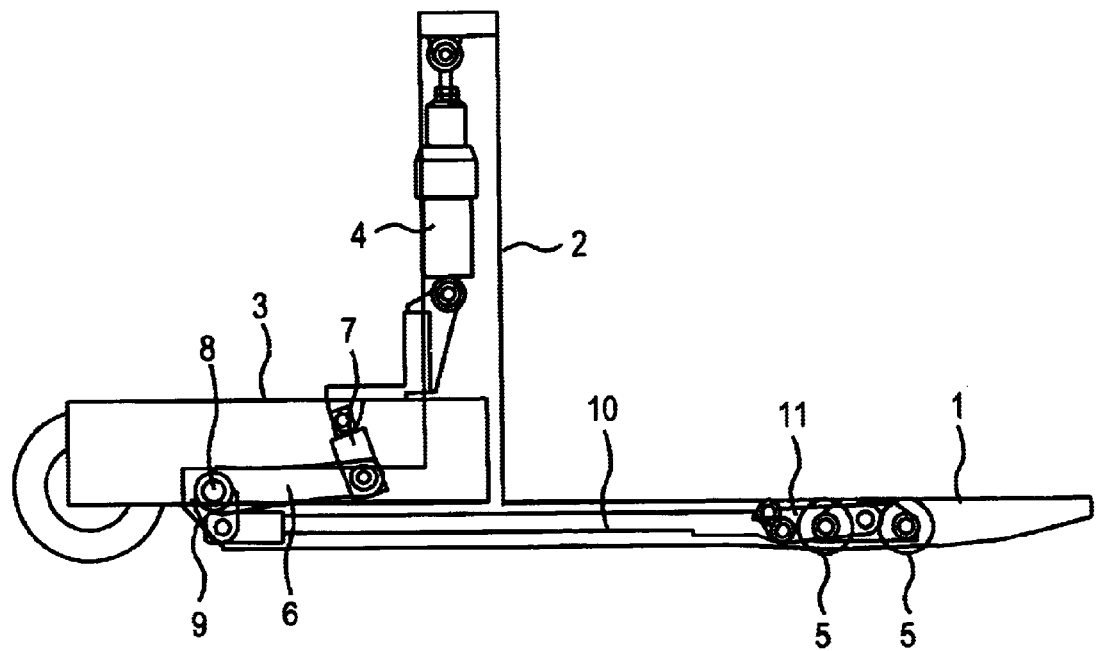

The truck shown in FIGS. 1 and 2 includes two forward extending forks 1, a fork back 2 or wall extending upwards in the rear end of the forks and at last behind the fork back a platform part 3 connected to this for the driver to stand or sit on. In the lower position shown in FIG. 2 the load forks 1 are lowered and in this position the truck may be driven in under a loading pallet that is to be lifted and moved or be backed out from an already moved and lowered loading pallet.

The platform 3 is in a not shown way journaled vertically moveable in relation to the fork back 2 and the load forks 1. When the load forks are to be lifted an hydraulic cylinder 4 in the fork back 2 pushes the platform 3 downwards. In this way the rear end of the load forks are lifted up from the floor together with the fork back 2. The relative movement between fork back and platform is used also to push support wheel pairs 5 in the front ends of the forks down against the floor so that the load forks in their front end are lifted as much as in the rear end. The mechanic for the movement of the support wheels 5 includes a swing arm 6 journaled in the fork back 2, which swing arm 6 in its front end is pushed down by a spring device 7 that in turn is journaled in the platform part 3. The swing arm 6 transfers via its swing axle 8 and a second swing arm 9 (movement and force) to a pull rod 10 that in turn pivots a swing arm 11 arranged further to the front under the forks and that pivots the support wheels 5 down towards the floor or ground. For each fork a pull rod with accompanying swing arms and wheels are arranged.

The spring element 7 has as its object to reduce possible shocks that occur when the front support wheels (those below the load forks) of the truck pass an unevenness. The occurring forces and movements of the support wheels 5 are transferred via the above described arms and pull rods to the spring device 7. Since only one common spring device 7 is arranged for the support wheels of the two forks 1 the springing will in itself not bring any risk of increased inclination for the truck and the rollers or wheels do not become individually suspended but move springingly rather in parallel even if only the wheel pair of one fork hit an obstacle.

Since the rear wheel 12 of the truck is so large in relation to the small front wheels the need of springing for this wheel is considerably less and the effect is thus that the small front support wheels 5 become spring suspended.

Figure 3:
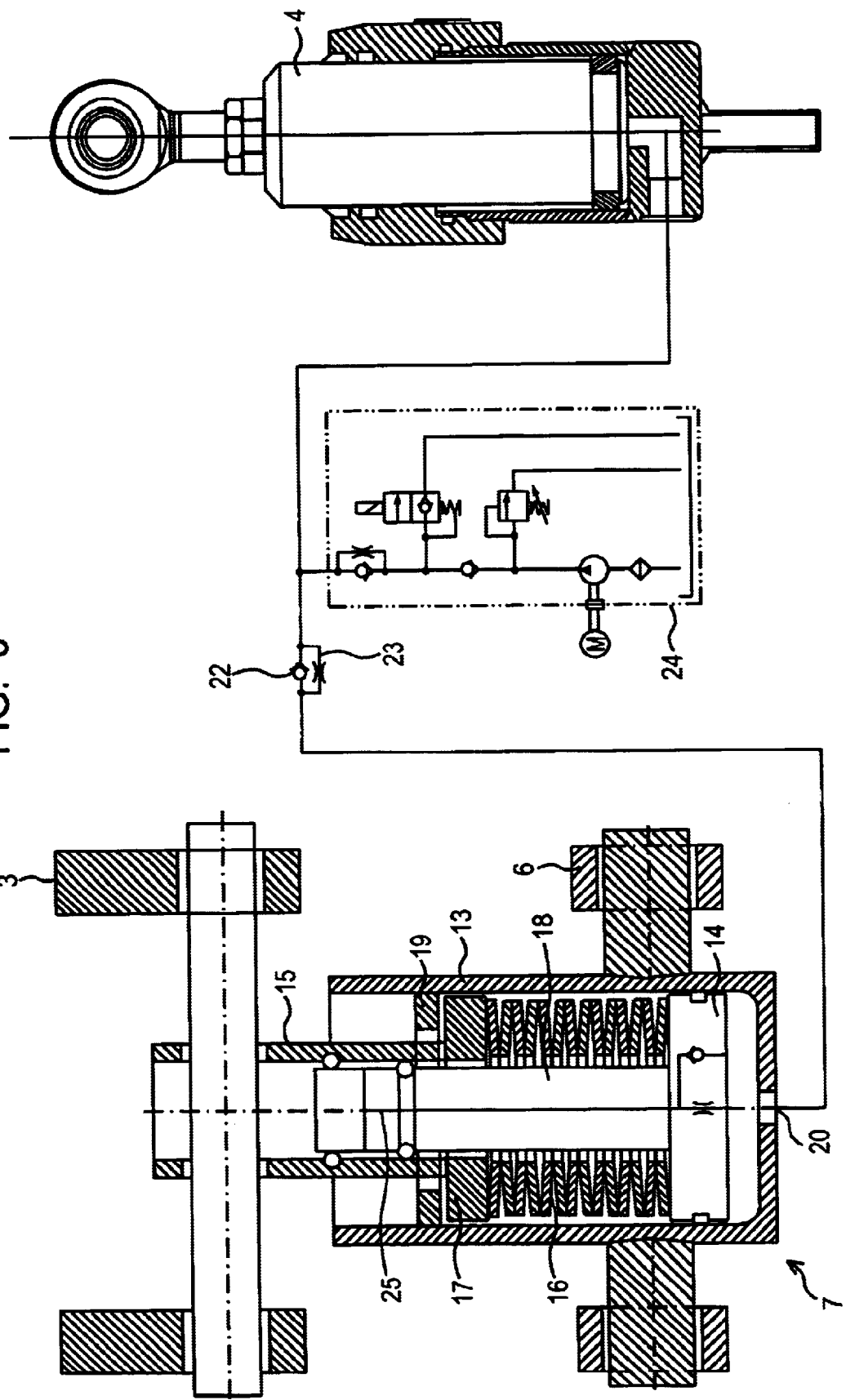

The spring element 7 is designed in the way that is shown in FIG. 3 and includes a cylinder 13. A piston 14 inside the cylinder is not fastened directly to the tube-shaped push rod 15 extending out from the cylinder but is resiliently (cup springs 16) supported against a ring shaped element 17 arranged in the inner end of the push rod 15. In order to guide the piston 14 a piston rod like guiding rod 18 is fastened to this and is displaceably journaled inside the tube shaped push rod 15 extending out of the cylinder 13.

The cylinder 13 has in the end facing away from the push rod 15 a connection 20 to the hydraulic system of the truck, coupled in parallel with the cylinder 4 lifting the forks. This means that when a load is lifted from the ground on the forks 1 the pressure that is required for the lifting cylinder will also be fed to the cylinder 13 in the spring device 7. This means in turn that the piston 14 in the cylinder 13 is pushed against the cup-springs 16 in proportion to the weight of the load. This compression of the springs however does not result in any change of position for the extending push rod that all the time will be located in the maximally extended position with the ring shaped element 17 of the push rod 15 in contact with the end 19 of the cylinder 13. Only the pretension is changed.

When a pressure shock occurs due to a support wheel striking against an evenness in the ground or floor the springing with the cup springs 16 can always take place provided that the pretension force of these is overcome. The fact that an extending can not take place does prevent the support wheels from springing down in holes but means at the same time a guaranteed damping of otherwise possible spring oscillations and a considerable improved comfort and "road holding" is obtained with a truck equipped in accordance with the invention.

If so desired one could consider to provide the cylinder shown in FIG. 3 with a cup spring or two under the ring shaped element 17 in the inner end of the push rod so that a certain elongation becomes possible. In this way also the shock that could arise when springing has taken place is dampened. Since furthermore the spring element in this way will be able to extend somewhat it will be possible for the wheels to spring down into holes. Since the choice of the number of cup springs over and under the ring shaped element of the push rod respectively the available spring distance can be adapted to different trucks or conditions.

The spring device 7 is coupled to the lifting cylinder by a return valve 22 that is coupled in parallel with a narrow and restricted passage 23. The return valve is oriented so that it allows a rapid flow of hydraulic oil to the spring device 7 at the lifting of a load so that practically instantaneously can the pretensioning oil pressure be fed to the spring device and pretension the springs. At a shock from the wheels that is transferred to the ring shaped element 17 and further via the springs 16 to the piston 14 the oil is not pushed away since the lifting cylinder normally is fully extended against its mechanical end stop, resulting in the springs taking the shock. Should for some reason the lifting piston not be in its maximally extended position the oil however has not time enough to pass away via the restriction 23 why also in this case the movement is taken by the cup springs 16.

When the load is once again lowered and put down on the floor the oil pressure in the system vanishes and the oil is led away from the spring device via the restricted passage and the cup springs expand until the next lifting takes place. The restricted passage is chosen so that the comparatively small amount of oil in the spring device by the cup springs has time to be pushed out before the truck has backed out from the first load and in under the next even if these are located immediately next to each other. The remaining part of the hydraulic system of the truck has been denoted 24.

If the big wheel of the truck should hit an obstacle this will instantaneously result in an increase in the pressure of the oil that acts on the cylinder and this increase in pressure may in turn mean that oil is fed away from the cylinder via the return valve (in its forward direction) and to the cylinder 13, in which the piston 14 can move against the spring force of the cup springs. Since the piston 14 is not coupled to the extending push rod no movement or force is transferred to the front support wheels 5 in the shown case since the push rod already is maximally extended. A certain springing is thus obtained also for the big wheel of the truck.

Since at the return springing the oil only flows through the restricted passage past the return valve this movement is dampened and there is no risk of the wheel getting into oscillations.

The restricted passage also serves as a damping for possible oscillations between the spring device and the lifting piston, for instance during the lifting itself.

If required a damping can also be arranged in the spring device itself, for instance by a restricted connection through the piston to its other side. Such a connection is in FIG. 3 schematically shown and denoted 25.

The above has been described the use of one single spring element; however one can consider to use several spring elements to provide more individual springing of separate wheels or groups of wheels.

As is apparent from the above the shown device enables springing of all the wheels of the truck improving comfort as well as road holding for this, simultaneously as no risk exists that an uneven load may make the truck incline. Nor do different loads result in different heights of the truck or the forks but this is always the same independent of the weight of the load.

What is claimed is:

1. A pallet lilting fork truck comprising a platform carrying vertically moveable forks, wherein the platform is supported adjacent its rear by supporting rollers or wheels, and the forks are supported adjacent their front ends by a vertically moveable support wheel assembly, which support wheel assembly upon lifting of the forks moves downwards from the fork, said truck further including a spring device for damping rolling shock to the support wheel assembly.

2. A pallet lifting fork truck according to claim 1, wherein the spring device comprises a common spring element arranged for the support wheels of the assembly.

3. A pallet lifting fork truck according to claim 1, wherein the spring device is pretensioned corresponding to a weight of a load.

4. A pallet lifting fork truck according to claim 3, wherein pretension is achieved using hydraulic lifting pressure of the truck.

5. A pallet lifting fork truck according to claim 4, wherein the spring device includes an hydraulic cylinder having a piston affixed at one end to a spring element and at its other end to a bracket, the spring device having means limiting its total length so that a feeding of oil to the hydraulic cylinder pretensions the spring device to not spring under a static load but only dampen dynamic forces due to unevenness in floor or ground over which the truck may roll.

6. A pallet lifting fork truck according to claim 4, wherein the hydraulic cylinder is coupled together with a lifting hydraulic system of the truck via a return valve that allows feeding of oil to the cylinder of the spring device while a restricted connection is arranged in parallel with the return valve to return oil to the lifting hydraulic system of the truck.

7. A pallet lifting fork truck according to claim 1, wherein the spring device exerts only a small resilience in an extending direction.

8. A pallet lifting fork truck according to claim 7, wherein the spring element is arranged inside an hydraulic cylinder between the cylinder's piston and the cylinder's extending push rod.

9. A pallet lifting fork truck according to claim 8, wherein a spring element having limited degree of compressibility is arranged between an end of the cylinder and an end of the push rod.

10. A pallet lifting fork truck according to claim 1, wherein the spring element comprises at least one cup spring.

11. Spring device for a pallet lifting truck, wherein a first end of the spring device is constituted by a hydraulic cylinder having a piston which is connected at one end to a spring element, and at its other end is connected to a fastening bracket, the spring device including means limiting a total length of the element so that oil fed to the hydraulic cylinder pretensions the spring element, whereby the spring device will not spring at static load but only dampen dynamic forces due to unevenness in floor or ground over which the truck may roll.

* * * * *